W. O. SNYDER.
Carriage Top Rest.

No. 86,107.    Patented Jan. 19, 1869.

Witnesses:    Inventor:

WILLIAM O. SNYDER, OF PHILADELPHIA, PENNSYLVANIA.

Letters Patent No. 86,107, dated January 19, 1869.

REST FOR CARRIAGE-TOP.

The Schedule referred to in these Letters Patent and making part of the same

*To all whom it may concern:*

Be it known that I, WILLIAM O. SNYDER, of Philadelphia, State of Pennsylvania, have invented an improved Rest for the Tops of Carriages; and I do hereby declare the following to be a full, clear, and exact description of the same.

My invention consists of an elastic rest, constructed and applied in the manner fully described hereafter, for the support and protection of the light wooden bows which form the frame of a carriage-top.

In order to enable others skilled in the art to make and apply my invention, I will now proceed to describe its construction and operation, reference being had to the accompanying drawing, which forms a part of this specification, and in which—

Figure 1:
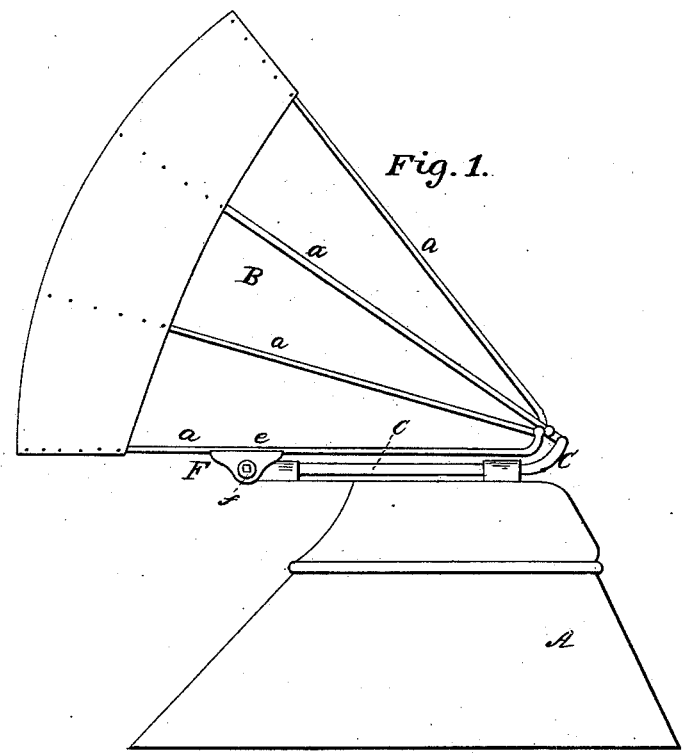
Figure 2:

Figure 1 is a side view of a portion of a carriage, with my improved rest for the falling top of the same;

Figure 2, a plan view of part of fig. 1; and

Figure 3:
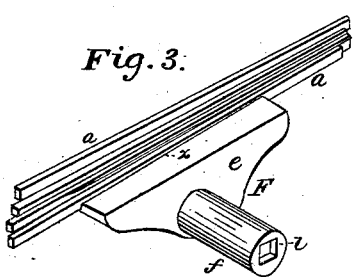
Figure 4:
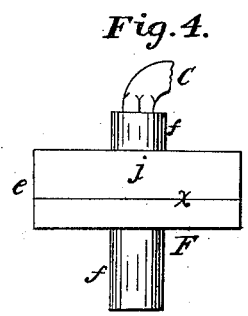

Figures 3 and 4, detached views of the rest, drawn to an enlarged scale.

Similar letters refer to similar parts throughout the several views.

In fig. 1, A represents the body of a carriage, and B, what is commonly known as a "falling top," the frame of which consists of light wooden bows, $a$, hinged, at two opposite points, to iron rods $c$, secured to the body of the carriage.

These bows are so arranged that when the top is thrown back or lowered, they shall fold, one within the other, in order that all of them may fall upon one horizontal bar or rest, which thus limits the backward and downward motion of the top, and is intended to prevent it from becoming strained. (See figs. 2 and 3.)

The rest, as usually constructed, is merely the end of the rod $c$, bent at right angles, as seen in fig. 2, and covered with leather.

The objection to this rest is its rigidity, and the fact that it does not offer sufficient bearing-surface to the bows, which are rapidly worn, and frequently broken by being brought into violent contact with its rounded surface. Efforts have been make to overcome these objections by encasing the rest in sleeves of rubber, but with only partial success.

My improved rest, which is shown at F, figs. 3 and 4, is made in one piece, of India rubber or other equivalent elastic material, and consists of two main portions, a block, $e$, and a transverse tube, $f$, having a square opening, $i$, which is adapted to the squared end of the rod $c$.

The rest is thus secured in its place, and the portion $e$ maintained in a proper horizontal position, the bows resting upon an extended flat surface, $j$, fig. 4, and being prevented from moving laterally by a shoulder, $x$, on each of the rests.

It will be readily seen, without further description, that this rest will fully protect and afford sufficient support for the bows, and will entirely obviate the objections to the rest in common use.

Without claiming broadly an elastic rest for buggy-tops,

I claim as my invention, and desire to secure by Letters Patent—

The rib, forming a shoulder, $x$, on the block $e$, for the purpose described.

In testimony whereof, I have signed my name to this specification, in the presence of two subscribing witnesses.

WM. O. SNYDER.

Witnesses:
   E. H. BAILEY,
   HARRY SMITH.